United States Patent [19]

Theodoulou

[11] 4,222,266

[45] Sep. 16, 1980

[54] BODY MOTION COMPENSATION FILTER WITH PITCH AND ROLL CORRECTION

[76] Inventor: Samuel M. Theodoulou, 23 Greenmount Rd., Bramalea, Ontario, Canada

[21] Appl. No.: 65,782

[22] Filed: Aug. 13, 1979

[30] Foreign Application Priority Data

Aug. 17, 1978 [CA] Canada .................................. 309540

[51] Int. Cl.³ ........................ G01S 15/10; G01S 15/89
[52] U.S. Cl. ..................................... 73/179; 367/100; 367/130
[58] Field of Search ..................... 73/178 R, 179, 509; 367/130, 129, 100, 106, 124, 126

[56] References Cited

U.S. PATENT DOCUMENTS

| | | | |
|---|---|---|---|
| 3,196,691 | 7/1965 | Escobosa | 73/179 X |
| 4,091,356 | 5/1978 | Hutchins | 367/130 X |

Primary Examiner—James J. Gill
Attorney, Agent, or Firm—Rogers, Bereskin & Parr

[57] ABSTRACT

An electronic filter for use in determining the position of a body travelling through water relative to a datum such as mean sea level, and having specific application to underwater seismic systems that produce profiles of the terrain beneath bodies of water. The filter is connected to an accelerometer and a pressure transducer, physically located within the body, that respectively produce an acceleration signal indicative of the body's vertical acceleration and a pressure signal indicative of the body's vertical displacement with respect to the datum. The filter combines the acceleration and pressure signals to effectively isolate a signal proportional to noise generated by the pressure transducer. The filter then combines the signal so isolated with the pressure transducer signal to produce a vertical displacement signal relatively free from noise. The filter is used in association with apparatus that produces a correction signal that approximates accelerometer signal components corresponding to the effect of gravity on the accelerometer. The filter combines the correction signal with the acceleration signal to attenuate noise components in the filter output signal that correspond to the gravity effects.

7 Claims, 8 Drawing Figures

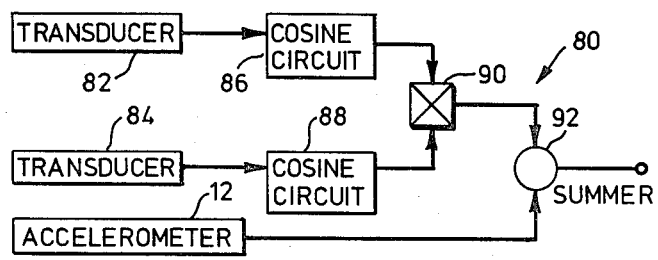
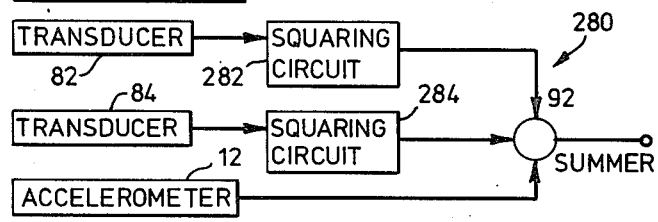
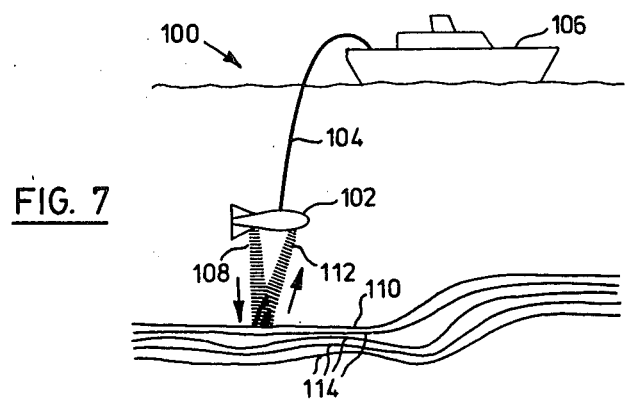
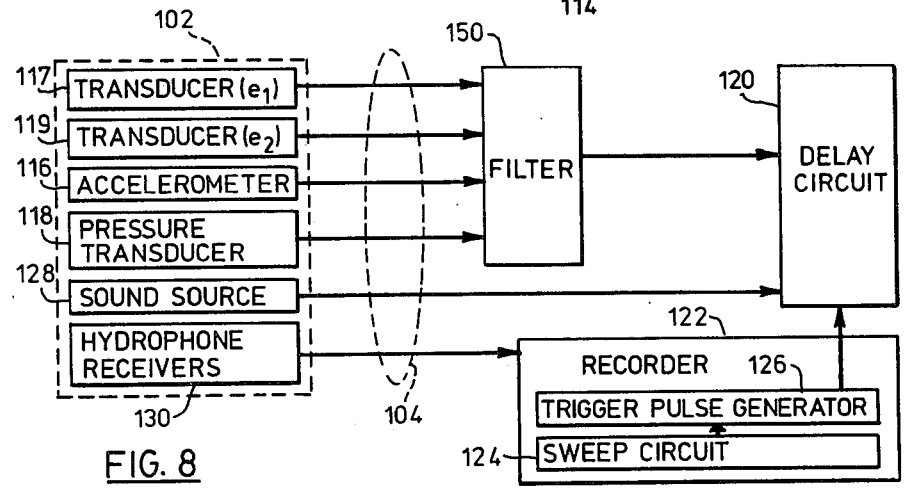

BODY MOTION COMPENSATION FILTER WITH PITCH AND ROLL CORRECTION

The invention relates to an electronic filter for use in determining the position of a body travelling through water relative to a datum such as mean sea level and to apparatus for further attenuating noise components in the filter's output signal.

The invention has specific application to an underwater seismic system for use in surveying the terrain under a body of water. Such systems commonly include a towed body, generally referred to as a "fish," which is provided with a sound source and hydrophones or like sound sensors. Very briefly, a sound pulse is generated and directed towards the bottom terrain and the reflected signal is detected by the hydrophones. From the delay between generation of the sound pulse and detection of the reflected pulse, an estimate of the distance to the reflecting layer of the terrain below may be obtained. By towing the fish at a relatively constant speed and by sampling the distance to the bottom terrain at regular intervals, it is possible with a chart recorder to produce a profile of the bottom terrain.

The quality of the profile obtained may be seriously degraded by vertical movement of the fish during the sampling process. Upward movement of the fish makes the bottom terrain appear farther from the datum; downward movement makes the terrain appear closer. A very significant factor in this respect is heaving of the fish as the towing vessel is buffeted by surface waves. This heaving motion translates onto the chart recorder as an oscillatory pattern which tends to reduce the resolution and usefulness of the profile. U.S. Pat. No. 4,091,356 to Hutchins discloses apparatus for compensating for such heaving motion, including pressure and acceleration transducers for use in determining the instantaneous vertical displacement of the fish with respect to the mean sea level.

Pressure and acceleration transducers presently used are subject to noise problems. This noise tends to degrade the quality of chart recordings in a manner not unlike that of the heaving motion experienced by the fish.

More specifically, the pressure transducer used will generally derive from pressure measurements a position signal indicative of the vertical displacement of the fish with respect to a datum such as mean sea level. The position signal is likely to be subject to noise owing to variations of pressure caused by surface wave action. Since this same wave action buffets the towing vessel, the pressure variations tend generally to have a frequency range similar to that of the heaving motion. This overlap in spectra makes it difficult to attenuate pressure transducer noise without affecting the portion of the position signal reflecting the heaving motion of the fish.

The accelerometer used will generally produce an acceleration signal proportional to the acceleration of the fish along a specific axis through the accelerometer. The axis will normally be arranged to be in a substantially vertical position when the fish is moving smoothly through water so that the acceleration signal is substantially indicative of the vertical acceleration of the fish. Such an accelerometer can generally be expected to have a zero frequency offset corresponding to the effect of gravity on the accelerometer. Because the accelerometer axis tends to tilt from a vertical position as the accelerometer moves with the pitching and rolling of the fish, the gravity offset will at any instant be attenuated by the cosine of the angle by which the axis is tilted from a vertical position: the gravity offset is in effect modulated by the pitching and rolling of the fish.

The modulated gravity offset is an accelerometer noise signal which can be expected to have a very broad frequency range and a significant zero frequency component owing to the fact that over the typical range of angles formed by the accelerometer axis with respect to a vertical position the cosine function produces a positive result. The zero frequency noise component can in practice be the principal portion of the accelerometer noise and can be difficult to remove without distortion of the vertical acceleration signal and ultimately of the displacement signal to be produced.

The frequency spectra of the various signals will vary depending on the physical circumstances in which the fish and the towing vessel are located; however, it has been found practical for design purposes to assume that the period of the heaving motion will be in the order of 6 to 10 seconds with a resultant frequency spectrum centered about 0.125 Hz. As mentioned above, the frequency spectrum of the pressure transducer noise can tend to overlap of the heaving motion.

As indicated above, the invention has two aspects. In a first aspect the invention provides an electronic filter for producing from acceleration and pressure signals as described above a displacement signal indicative of the true vertical displacement of a body travelling through water relative to a datum such as mean sea level. In a second aspect the invention provides apparatus for attenuating noise components in the filter's output signal corresponding to the effect of gravity on the accelerometer.

A filter constructed according to the invention includes differentiation means for producing a differentiated signal proportional to the second derivative of the pressure signal. The differentiated signal is in effect indicative of the vertical acceleration of the body. First summing means are provided for producing a first summation signal proportional to a weighted sum of the differentiated signal and the acceleration signal. The weighting is such that components of the first summation signal corresponding to the second derivative of the position signal and to the acceleration signal cancel one another. Information concerning the displacement of the body is thus eliminated from the first summation signal so that the first summation signal comprises essentially signal components indicative of the accelerometer noise and the second derivative of the pressure transducer noise.

The filter is provided with integration means that produce an integrated signal proportional to the double integral of the first summation signal. Signal components corresponding to zero frequency accelerometer noise are attenuated by attenuating means included in the integration means. Signal components corresponding to higher frequency accelerometer noise will tend to be attenuated during the integration process as the frequency response of a double integrator tends to roll off quickly with increasing frequency. The integrated signal is thus substantially proportional to the pressure transducer noise.

The filter is provided with second summation means for producing a second summation signal proportional to a weighted sum of the integrated signal and the pressure transducer signal. The weighting is such that the integrated and pressure signals are effectively added in a manner that cancels signal components corresponding to pressure transducer noise, leaving the second summation signal substantially proportional to the position signal and relatively free of noise.

The apparatus intended for use in association with the filter produces a correction signal that approximates portions of the gravity noise appearing in the accelerometer signal. The apparatus then combines the correction signal with the acceleration signal in a manner that cause signal components corresponding to accelerometer noise to effectively cancel.

The apparatus generates first and second signals that are respectively proportional to the cosine of an angle $\theta_1$ and to the cosine of an angle $\theta_2$, were $\theta_1$ is the angle that a projection of the axis of the accelerometer forms at any instant with respect to a vertical position, and $\theta_2$ is the angle which a projection of the axis on a second vertical plane, perpendicular to the first plane, forms at any instant with respect to a vertical position. Multiplication means are provided for generating a correction signal proportional to the product of the first and second signals. Alternatively, the first and second signals are used to generate a correction signal proportional to terms of a power series expansion of cosine $\theta$, where $\theta$ is the angle by which the axis is at any instant inclined from a vertical position, in terms of $\theta_1$ and $\theta_2$. Either correction signal is then combined with the acceleration signal to effectively cancel noise components corresponding to the effect of gravity on the accelerometer.

The invention will be better understood with reference to drawings in which:

FIG. 4 is a block diagram of apparatus constructed according to the invention to compensate for the effect of gravity on the accelerometer;

FIG. 5 is an alternative embodiment of apparatus constructed according to the invention;

FIG. 7 is a diagrammatic representation of an underwater seismic system comprising a towed body and towing vessel, shown above a stratafied bottom; and FIG. 8 is a schematic representation of a compensation system, incorporating the filter and apparatus of FIG. 6, used in the underwater seismic system of FIG. 7.

Figure 1:
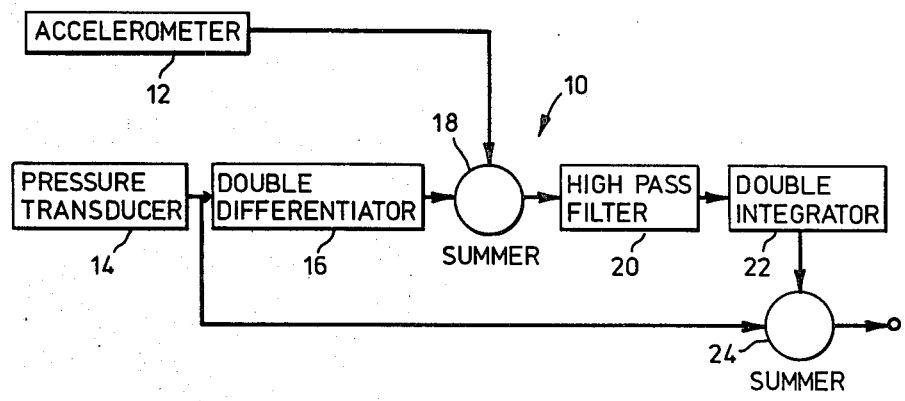
FIG. 1 is a block diagram of an electronic filter constructed according to the invention connected to pressure and acceleration transducers.

Reference is made to FIG. 1 which shows a filter 10 constructed according to the invention connected to an accelerometer 12 and a pressure transducer 14. The accelerometer 12 and the pressure transducer 14 respectively produce acceleration and pressure signals as described above.

The pressure signal is double differentiated by a double differentiator 16 to produce a differentiated signal indicative of the vertical acceleration of the body. The acceleration signal from the accelerometer 12 and the differentiated signal are then individually scaled and added by a summer 18 to produce a first summation signal. The scaling is such that components of the first summation signal corresponding to the vertical acceleration signal from the accelerometer 12 and to the double differentiated position signal from the pressure transducer 14 effectively cancel. The first summation signal thus consists substantially of signal components corresponding to the accelerometer noise and pressure transducer noise.

The first summation signal is then high pass filtered by a filter 20 to produce a filtered signal effectively free of zero frequency components corresponding to accelerometer noise. The filtered signal is then double integrated by double integrator 22 to produce an integrated signal substantially proportional to the pressure transducer noise. As mentioned above, the double integrator 22 will serve also to substantially attenuate higher frequency components of the accelerometer noise.

The integrated signal and the pressure signal are then individually scaled and added by a second summer 24 to produce a second summation signal. The scaling is such that the integrated signal is effectively used to cancel or attenuate noise components corresponding to pressure transducer noise in the second summation signal.

Figure 2:
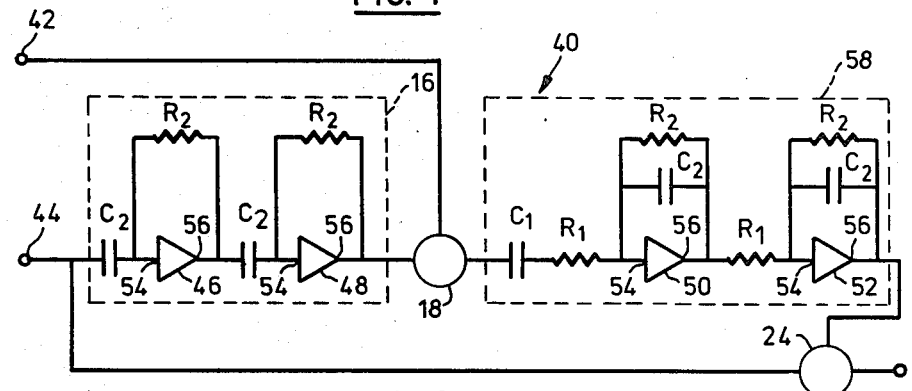
FIG. 2 is a schematic representation of a partial realization of the filter of FIG. 1.

FIG. 2 shows a filter 40 which is a partial realization of the filter 10 of FIG. 1. The filter 40 has input terminals 42, 44 which respectively receive acceleration and pressure signals from the accelerometer 12 and the pressure transducer 14. The filter 40 comprises four operational amplifiers 46, 48, 50, 52 which for the sake of clarity have been shown only with impedances connected to inverting input terminals 54 and output terminals 56.

The filter 40 has a double differentiator 16 comprising the amplifiers 46 and 48 connected in series, each in standard differentiator configuration.

The filter 40 also includes integration means 58 which corresponds to the high pass filter 20 and double integrator 22 of FIG. 1. The integration means 58 are not an ideal double integrator but have a pole-zero configuration which provides a 40 db/decade roll-off in the frequency range of the pressure transducer noise. The particular pole-zero configuration avoids saturation of the integration means 60 as a result of D.C. offsets and drift. The introduction of a capacitor $C_1$ at the inverting terminal 54 of the amplifier 52 serves to add another pole-zero pair to the double integration means 58. This pole-zero pair effectively provides a high pass filter which blocks zero frequency signals.

The summers 18, 24 would in practice be operational ammplifiers in standard summing or subtracting configurations depending on the polarity of the signals received at terminals 42, 44.

Figure 3:
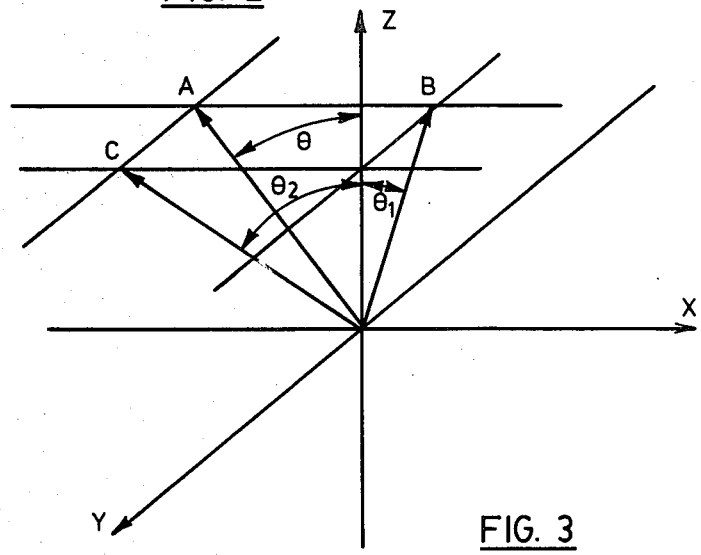
FIG. 3 is a three dimensional representation of the relationship between the axis of an accelerometer and projections of the axis on mutually prependicular, vertical planes.

The operation of apparatus constructed according to the invention will be better understood with reference to FIG. 3 which illustrates the instantaneous orientation of an axis A, the axis of the accelerometer 12 referred to above, with respect to three mutually perpendicular axes X,Y, and Z. The axis A is inclined at an angle $\theta$ with respect to a vertical position which in FIG. 3 is indicated by the Z axis. The axis A has a first projection B on a first plane, the YZ planes, and a second projection C on a second plane, the XA plane. Projections B and C will at any instant be inclined respectively at angles $\theta_1$ and $\theta_2$ from a vertical position. In practice, the angles $\theta_1$ and $\theta_2$ may be measured by the appropriate mounting of gyroscopic transducers in the body containing the accelerometer 12. A suitable transducer for such purposes is the Timex Rate Gyro SD-000. Pendulum pots are less reliable tranducers, having response characteristics that vary with the motion of the body.

It will be appreciated that in the framework presented by FIG. 3 the accelerometer noise signal will be proportional to $G_o \cos \theta$ where $G_o$ is the acceleration due to gravity. Since $\theta$, $\theta_1$, and $\theta_2$ will be related by the relationship $\cos \theta = \theta_1 \cdot \cos \theta_2$, a signal proportional to the product $\cos \theta_1 \cdot \cos \theta_2$ will also be proportional to the accelerometer noise signal. For small variations of $\theta$ about zero, $\cos \theta_1$ is approximately equal to $1 - \theta_1^2/2$, the first two terms of the MacLaurin series expansion of $\cos \theta_1$. A similar expression will also be a good estimator in such circumstances of $\cos \theta_2$. It will be apparent that for small $\theta$ the expression $(1 - \theta_1^2/2 - \theta_2^2/2)$ will be a reasonable estimator of the product $\cos \theta_1 \cdot \cos \theta_2$, and that a signal proportional to the expression will in turn be substantially proportional to the accelerometer noise signal. Where the filter in association with which the apparatus is to be used has a transfer function zero which removes zero frequency components of the accelerometer signal a sufficient correction signal may be obtained by generating a signal proportional to the sum of $\theta_1^2$ and $\theta_2^2$. It will further be appreciated that a correction signal proportional to power series expansions of $\cos \theta$ incorporating higher order terms may be used to obtain a more complete cancellation of noise.

For the purpose of the invention, the vector A may be decomposed into projections in any two mutually perpendicular, vertical planes. In practice, it is sufficient to locate two gyroscopic transducers in a towed body so that the transducers measure mutually perpendicular components of the tilting of the body.

Reference is made to FIG. 4 which shows apparatus 80 connected to the accelerometer 12 for compensating for the effect of gravity on the accelerometer on the acceleration signal. The apparatus 80 comprises first and second transducers 82, 84 physically located within the towed body to respectively produce a signal proportional to $\theta_1$ and a signal proportional to $\theta_2$, as defined above. First and second cosine circuits 86, 88 respectively receive the first and second transducer signals and respectively produce therefrom a first signal proportional to the cosine of $\theta_1$ and a second signal proportional to the cosine of $\theta_2$. It will be appreciated that the gain of the transducers 82, 84 must accomodate the transfer functions of the cosine circuits 86, 88 so that the first and second signals are in fact indicative of $\cos \theta_1$ and $\cos \theta_2$, respectively. A suitable device for generating the cosine of a transducer signal is the INTERSIL 8038, a wave form generator which provides a diode array implementing a sine function which may effectively be used as a cosine function generator by introducing a constant offset voltage at the input of the diode array.

The apparatus 80 includes a multiplier 90 that generates a correction signal proportional to the product of the first and second signals. As mentioned above, the correction signal will be proportional to the accelerometer noise signal. A summer 92 produces a summation signal proportional to a weighted sum of the acceleration signal from the accelerometer 12 and the correction signal. The weighting is chosen so that components of the summation signal corresponding to the correction signal cancel portions of the summation signal corresponding to the effect of gravity on the accelerometer 12. The weighting is achieved by multiplying the output of multiplier 90 by a signal representing $-G_o$ ($G_o$ may be represented by a fixed voltage) and adding this negative product to the accelerometer signal in summer 92.

FIG. 5 illustrates apparatus 280 that is similar to the apparatus 80 of FIG. 4 except that the cosine circuits 86, 88 and the multiplier 90 comprised in the apparatus 80 have been replaced by first and second squaring circuits 282, 284. The squaring circuits 282, 284 respectively produce a first squared signal proportional to the square of the first transducer signal and a second squared signal proportional to the square of the second transducer signal. The summer 92 now produces a summation signal proportional to a weighed sum of the accelerometer signal and the first and second square signals. The weighting (achieved by multiplying each of the first and second square signals by a fixed voltage representing $-G_o$) is such that components of the summation signal corresponding to the first and second squared signal cancel portions of the summation signal corresponding to the effect of gravity on the accelerometer.

Because each of the squaring circuits 282, 284 displays a non-linearity which is not as pronounced as that of the cosines circuits 86, 88, the squaring circuits 282, 284 do not impose as severe requirements on the gains of the transducers 82, 84. Also, if the apparatus 280 is intended for use with a filter have a transfer function zero that removes zero frequency components of the accelerometer signal, a weighted sum of the first and second squared signals can be expected to provide a satisfactory correction signal.

Figure 6:
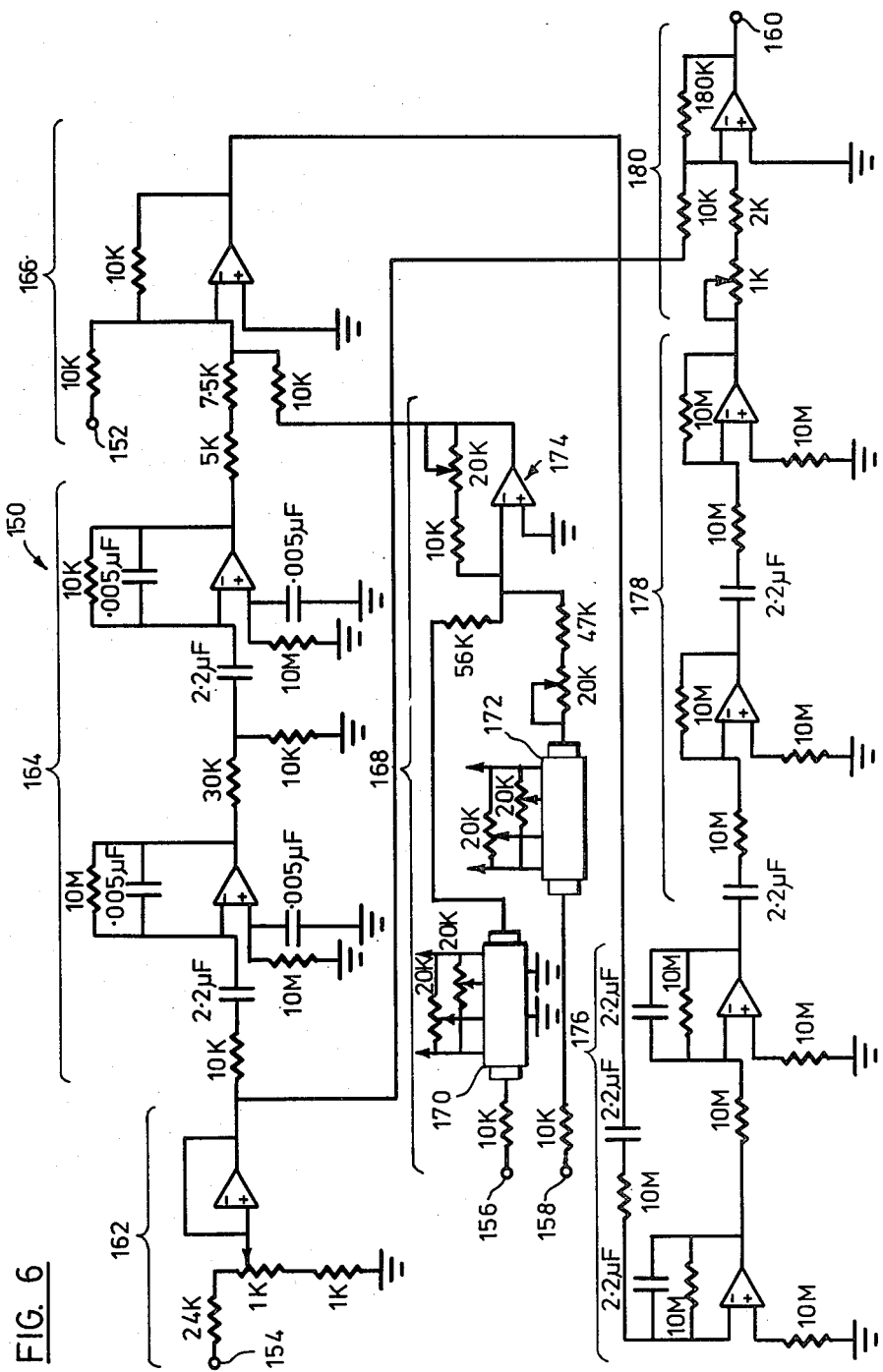
FIG. 6 is a schematic representation of an embodiment of the invention illustrating the co-operation between filter and apparatus constructed according to the invention.

FIG. 6 illustrates a filter 150 that incorporates both aspects of the invention. The filter 150 has input terminals 152, 154 for respectively receiving acceleration and pressure signals, as described above; input terminals 156, 158 for respectively receiving first and second transducer signals, as described above; and an output terminal 160 where a vertical displacement signal generated from the acceleration and pressure signals is made available.

A scaling circuit 162 serves to scale the pressure signal received at the input terminal 154. The scaling factor used will depend on the gain of the pressure transducer connected to the terminal 154, that is, on the constant of proportionality relating the pressure transducer output signal to the actual pressure experienced by the transducer.

A differentiation circuit 164 serves to double differentiate the scaled pressure signal to produce a differentiated signal. It should be noted that the differentiation circuit 164 is frequency limited to prevent saturation by high frequency noise. The frequency range in which the differentiation function is performed need only be broad enough to encompass the spectra of the position signal and the pressure transducer noise described above.

A first summing circuit 166 combines the acceleration signal received at the input terminal 152 with the differentiated signal to produce a first summation signal. The weighting of the summation is such that signal components of the first summation signal corresponding to the second derivative of the position signal and to the vertical acceleration signal cancel. The first summation signal should consist essentially of signal components corresponding to the second derivative of the pressure transducer noise and to accelerometer noise.

Apparatus 168 in association with the first summing circuit 166 serves to attenuate signal components of the first summation signal that correspond to accelerometer noise. The apparatus 168 comprises first and second multipliers 170, 172. The input terminals of each of the multipliers 170, 172 are tied so that the multipliers 170, 172 provide squaring functions and are connected to the input terminals 156, 158 to receive the first and second transducer signals, as shown. The first and second multipliers 170, 172 respectively produce first and second square signal, as described above, which are then added by a second summing circuit 174 to generate a correction signal. The correction signal is received by the first summing circuit 166 which combines the correction signal with the acceleration signal received at the input terminal 152 to obtain the desired attenuation of signal components corresponding to accelerometer noise.

An integration circuit 176, corresponding to the integration means 60 of FIG. 2, receives the first summation signal and produces therefrom an integrated signal. The integration circuit 176 serves both to attenuate signal components corresponding to zero and low frequency accelerometer noise and to double integrate signal components corresponding to the pressure transducer noise. The integrated signal is received by a high-pass filter 178 which further attenuates signal components corresponding to low frequency accelerometer noise while permitting signal components corresponding to the pressure transducer noise to pass substantially unattenuated. For practical purposes, the filtered, integrated signal should be substantially proportional to the pressure transducer noise.

A second summing circuit 180 receives the filtered, integrated signal from the high-pass filter 178 and the scaled pressure signal from the scaling circuit 162 and produces therefrom a second summation signal. The weighting for the summation is such that second summation signal components corresponding to pressure transducer noise effectively cancel, making available at the output terminal 160 a signal which corresponds essentially to the position signal. The second summation signal will thus be indicative of vertical displacement with respect to mean sea level or some other datum.

Use of filter and apparatus constructed according to the invention will be better understood with reference to FIGS. 7 and 8.

FIG. 7 shows an underwater seismic system 100 comprising a body 102 being towed with a cable 104 from a towing vessel 106. A sound pulse 108 is shown emanating from the towed body 102 and travelling towards a reflecting layer 110. The reflecting layer 110 causes a reflected sound pulse 112 to be directed upwardly toward the towed body 102. Further layers 114 would also produce reflected pulses, but the latter are not shown for the sake of clarity.

FIG. 8 shows a the filter 150 of FIG. 6 connected to an accelerometer 116, pressure transducer 118, first and second gyroscopic transducers 117, 119, and a delay circuit 120, all of which are included in the underwater seismic system 100. The accelerometer 116, the pressure transducer 118, and the first and second gyroscopic transducers 117, 119 are physically located within the body 102 and respectively produce acceleration, pressure, and first and second transducer signals as described above.

The underwater seismic system 100 includes a recorder 122 which is a conventional chart or drum recorder of a type having a repetitive sweep provided by sweep circuit 124. Each time the sweep circuit 124 initiates a sweep across the chart (not shown) a trigger signal is generated by a trigger signal generator 126. The delay circuit 120 receives the trigger signal, delays it in time, and then couples the trigger signal via the cable 104 to a sound source 128 located in the body 102. The delayed trigger signal activates the sound source 128 causing it to generate a sound pulse such as the pulse 108 of FIG. 4.

Reflected pulses such as the pulse 112 of FIG. 4 are detected at intervals by hydrophones receivers 130 which generate response signals indicating that reflected pulses have been detected. The amplitude and duration of each response signal will generally correspond to the amplitude and duration characteristic of each reflected sound pulse; however, variations in the characteristics of the successive response signals will normally not affect the operation of the underwater seismic system 100 in a material way.

Each response signal is received by the recorder 122 which then causes a point to be plotted by an electrically activated pen (not shown) that regularly sweeps the recorder chart (not shown). In effect, the recorder mechanically computes and plots the time elapsed from the generation of the trigger signal to the receipt by the recorder 28 of the response signal. The portion of the chart recording so produced will also be indicative of the distance to the reflecting layer giving rise to the reflected sound pulse, since the average distance to the reflecting layer during the travel time of the sound pulse and reflected sound pulse will be proportional to the time elapsed, the constant of proportionality being the velocity of sound divided by two. In a similar manner, the recorder 122 simultaneously plots from other response signals the distances to other reflecting layers.

The extent of the delay between the initiation of the sweep by the sweep circuit 124 and firing of the sound source 128 depends on the vertical displacement signal produced by the filter 10. The delay circuit 120 receives the displacement signal and delays the trigger signal by a fixed period plus a varying period, the varying period being proportional to the displacement signal. Thus, as the towed body 102 is displaced downwardly, the delay in the firing of the sound source 128 is increased; as the towed body 102 moves upwardly, the delay is decreased and the firing is effectively advanced. Changes in the delay in firing of the sound source 128 will be related to changes in the vertical displacement of the body 102 by a constant of proportionality which is twice the reciprocal of the velocity of sound in water. With such a constant of proportionality, the vertical displacement of the towed body 102 will appear to be the same at successive firings, for the purposes of the recorder 122.

A more detailed description of apparatus comprising an underwater seismic system such as the underwater seismic system 100 may be obtained from the Hutchins patent referred to above.

What I claim as my invention is:

1. For use in generating a signal indicative of the vertical displacement of a body travelling through water relative to a datum, the body containing an accelerometer that produces an acceleration signal comprising a vertical acceleration signal and an accelerometer noise signal, the body containing a pressure transducer that produces a pressure signal comprising a position signal indicative of the vertical displacement of the body relative to the datum and a pressure transducer noise signal, a filter comprising:

differentiation means connectable to the pressure transducer for producing a differentiated signal proportional to the second derivative of the pressure signal;

first summing means, connected to the differentiation means and connectable to the accelerometer, for producing a first summation signal proportional to a weighted sum of the differentiated signal and the acceleration signal, the weighting being such that components of the first summation signal corresponding to the second derivative of the position signal and to the vertical acceleration signal cancel one another, whereby the first summation signal consists essentially of signal components proportional to the accelerometer noise signal and to the second derivative of the pressure transducer noise signal;

integration means connected to the first summing means for producing an integrated signal proportional to the double integral of the first summation signal, the integration means including attenuating means for attenuating zero frequency components of the integrated signal; and, second summing means, connected to the integration means and connectable to the pressure transducer, for producing a second summation signal proportional to a weighted sum of the integrated signal and the pressure signal, the weighting being such that components of the second summation signal corresponding to the pressure transducer noise signal cancel, whereby the second summation signal is substantially proportional to the position signal.

2. A filter as claimed in claim 1 in which the attenuating means comprises a high pass filter whose pass band includes at least a substantial portion of the frequency range of the pressure transducer noise signal.

3. A filter as claimed in claim 2 in which the high pass filter completely blocks zero frequency signals.

4. For use in association with a body travelling through water, the body having an accelerometer which produces a signal indicative of the body's acceleration along an axis whose orientation with respect to a vertical position varies with pitching and rolling of the body, a projection of the axis on a first vertical plane being inclined at any instant from a vertical position by an angle $\theta_1$, a projection of the axis on a second vertical plane perpendicular to the first plane being inclined at any instant from a vertical position by an angle $\theta_2$, apparatus for reproducing the accelerometer signal with signal components corresponding to the effect of gravity on the accelerometer attenuated, the apparatus comprising:

correction signal generating means connectable to the body for generating a correction signal substantially proportional to at least the time varying portion of the product of the cosine of $\theta_1$ and the cosine of $\theta_2$; and, summing means connectable to the accelerometer and to the correction signal generating means for producing a summation signal proportional to a weighted sum of the accelerometer signal and the correction signal, the weighting being such that components of the summation signal corresponding to the correction signal cancel portions of the summation signal corresponding to the effect of gravity on the accelerometer.

5. Apparatus as claimed in claim 4 in which the correction signal generating means comprise:

first signal generating means connectable to the body for generating a first signal, substantially proportional to the cosine of $\theta_1$;

second signal generating means connectable to the body for generating a second signal, substantially proportional to the cosine of $\theta_2$;

multiplication means connected to the first and the second signal generating means for producing a correction signal, the correction signal being proportional to the product of the first and second signals.

6. Apparatus as claimed in claim 5 in which the first signal generating means comprise:

a first transducer connectable to the body for producing a first transducer signal proportional to $\theta_1$; and, first cosine function generating means connected to the first transducer for producing a first cosine signal proportional to the cosine of the first transducer signal.

7. Apparatus as claimed in claim 6 in which the second signal generating means comprise:

a second transducer connectable to the body for producing a second transducer signal proportional to $\theta_2$; and, second cosine function generating means for producing a second cosine signal proportional to the cosine of the second transducer signal.

* * * * *